US008570170B2

(12) United States Patent
Zhang

(10) Patent No.: US 8,570,170 B2
(45) Date of Patent: Oct. 29, 2013

(54) ELECTRONIC DEVICE AND METHOD FOR NOISE ALERTING

(75) Inventor: Geng-Liang Zhang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 471 days.

(21) Appl. No.: 12/908,843

(22) Filed: Oct. 20, 2010

(65) Prior Publication Data

US 2011/0148629 A1    Jun. 23, 2011

(30) Foreign Application Priority Data

Dec. 22, 2009    (CN) .......................... 2009 1 0312009

(51) Int. Cl.
*G08B 21/00*    (2006.01)
(52) U.S. Cl.
USPC ......................................... 340/540; 340/635
(58) Field of Classification Search
None
See application file for complete search history.

(56) References Cited

U.S. PATENT DOCUMENTS

| | | | | |
|---|---|---|---|---|
| 5,317,273 A * | 5/1994 | Hanson et al. | ................ | 324/616 |
| 7,983,426 B2 * | 7/2011 | Schuler et al. | ................ | 381/56 |
| 8,077,872 B2 * | 12/2011 | Dyer et al. | ................ | 381/56 |
| 8,150,043 B2 * | 4/2012 | Goldstein et al. | ................ | 381/56 |
| 8,194,864 B2 * | 6/2012 | Goldstein et al. | ................ | 381/56 |
| 8,194,865 B2 * | 6/2012 | Goldstein et al. | ................ | 381/56 |
| 8,208,644 B2 * | 6/2012 | Goldstein et al. | ................ | 381/56 |
| 8,311,228 B2 * | 11/2012 | Goldstein et al. | ................ | 381/56 |
| 2004/0179694 A1 * | 9/2004 | Alley | ................ | 381/55 |
| 2004/0190729 A1 * | 9/2004 | Yonovitz et al. | ................ | 381/72 |
| 2008/0037797 A1 * | 2/2008 | Goldstein et al. | ................ | 381/56 |
| 2008/0159547 A1 * | 7/2008 | Schuler et al. | ................ | 381/56 |
| 2008/0240458 A1 * | 10/2008 | Goldstein et al. | ................ | 381/72 |
| 2008/0267416 A1 * | 10/2008 | Goldstein et al. | ................ | 381/56 |
| 2010/0034395 A1 * | 2/2010 | Lundin | ................ | 381/57 |
| 2011/0003577 A1 * | 1/2011 | Rogalski et al. | ................ | 455/404.1 |
| 2013/0035608 A1 * | 2/2013 | Goldstein et al. | ................ | 600/559 |

FOREIGN PATENT DOCUMENTS

CN              1601457           3/2005

* cited by examiner

*Primary Examiner* — Julie Lieu
(74) *Attorney, Agent, or Firm* — Altis & Wispro Law Group, Inc.

(57) ABSTRACT

A method for noise alerting includes: recording ambient sound around an electronic device and generating corresponding sound signals; determining a volume of the ambient sound according to the sound signal; obtaining a noise grade corresponding to the determined volume of the ambient sound in a first table mapping relationships between a plurality of volumes and noise grades; searching a second table mapping relationships between the noise grades and solutions to obtain a solution corresponding to the obtained noise grade of the ambient sound; and outputting an alert to a user for recommending the obtained solution. The electronic device for noise alerting is also provided.

7 Claims, 2 Drawing Sheets

ELECTRONIC DEVICE AND METHOD FOR NOISE ALERTING

BACKGROUND

1. Technical Field

The present disclosure relates to electronic devices and, particularly, to an electronic device and a method thereof for noise alerting by solving problems of noise.

2. Description of Related Art

When the volume of the noise is too high, it is harmful to human hearing. However, it is difficult to accurately determine if the noise level reaches a harmful level only by human hearing.

Therefore, it is necessary to provide an electronic device and a method for noise alerting.

BRIEF DESCRIPTION OF THE DRAWINGS

Many aspects of the present disclosure should be better understood with reference to the following drawings. The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
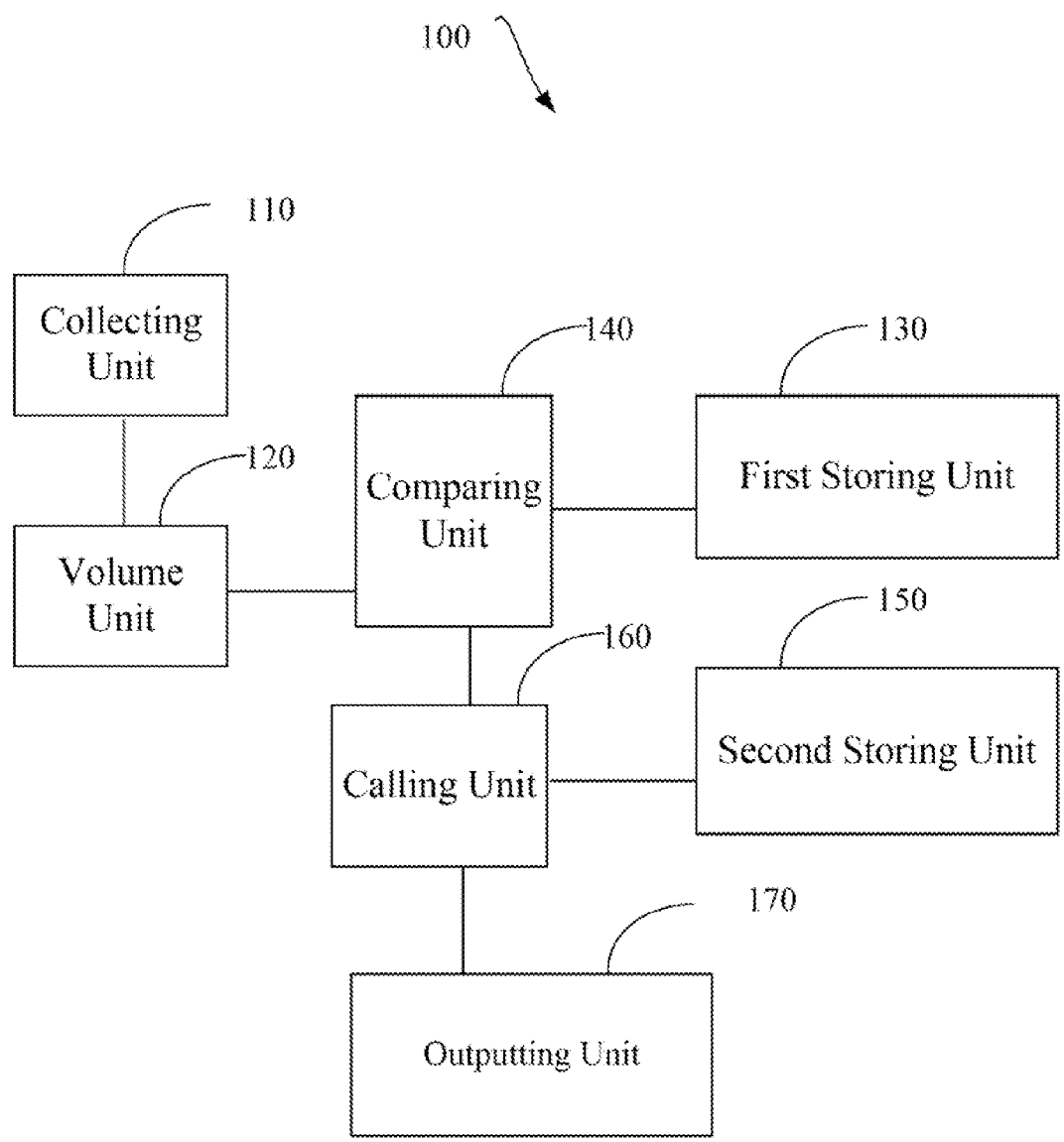
FIG. 1 is a schematic diagram showing an electronic device for noise alerting, according to one exemplary embodiment.

Referring to FIG. 1, an electronic device 100, according to an embodiment, includes a collecting unit 110, a volume unit 120, a first storing unit 130, a comparing unit 140, a second storing unit 150, a calling unit 160, and an outputting unit 170. In this embodiment, the electronic device 100 is, but not limited to, a mobile phone, a personal digital assistant, or other portable electronic device.

The collecting unit 110 is configured to record ambient sound around the electronic device 100 and generate corresponding sound signals. The volume unit 120 is configured to determine a volume of the ambient sound according to the sound signals. The first storing unit 130 is configured to store a first table mapping relationships between a plurality of volumes and noise grades. The comparing unit 140 is configured to obtain the noise grade corresponding to the determined volume of the ambient sound in the first table.

Figure 2:
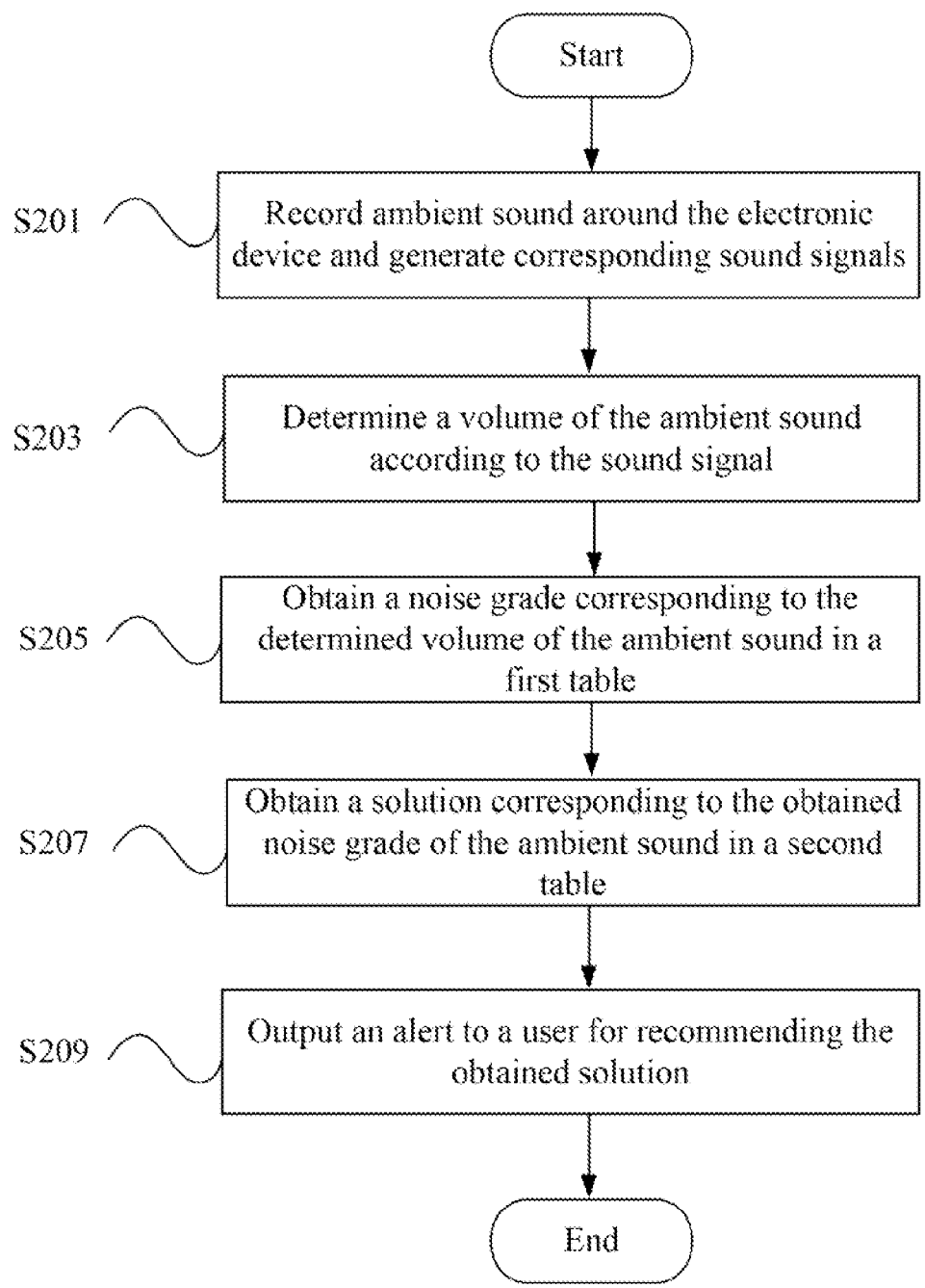
FIG. 2 is a flowchart of implementing a method of noise alerting by the electronic device of FIG. 1, according to one exemplary embodiment.

The second storing unit 150 is configured to store a second table mapping relationships between the noise grades and solutions. The solutions are used to alert the user to take appropriate countermeasures to reduce the risk of harm to the user from excessively loud noise in time. The solutions associated with the various noise grades, may alert users to take steps such as to insert earplugs, or turn down or off the electronic device 100, and so on. As shown in FIG. 2, the first storing unit 130 and the second storing unit 150 are independent memories, however, in other embodiments, the first storing unit 130 and the second storing unit 150 can be disposed in one memory divided into different data storage areas.

The calling unit 160 is configured to search the second table in the second storing unit 150 to obtain the solution corresponding to the obtained noise grade of the ambient sound. The outputting unit 170 is configured to output the alert to the user recommending the obtained solution. The outputting method applied in the outputting unit 170 may be, for example, lights flashing, a visual alert on a display, audible signals emitted from a speaker, or any combination thereof.

FIG. 2 is a flow chart of implementing a method of noise alerting with the aid of the electronic device 100 of FIG. 1.

In step S201, the collecting unit 110 records the ambient sound around the electronic device 100 and generates the corresponding sound signals. In step S203, the volume unit 120 determines the volume of the ambient sound according to the sound signals. In step S205, the comparing unit 140 searches the first table stored in the first storing unit 130 to obtain the noise grade corresponding to the determined volume of the ambient sound. In step S207, the calling unit 160 searches the second table stored in the second storing unit 150 to obtain the solution corresponding to the obtained noise grade of the ambient sound. In step S209, the outputting unit 170 outputs the obtained solution by lights flashing, a visual alert on a display, audible signals emitted from a speaker, or any combination thereof.

It will be understood that the above particular embodiments and methods are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. An electronic device for noise alerting, comprising:
   a collecting unit to record ambient sound around the electronic device and generate corresponding sound signals;
   a volume unit to determine a volume of the ambient sound according to the sound signals;
   a first storing unit to store a first table mapping relationships between a plurality of volumes and noise grades;
   a comparing unit to obtain the noise grade corresponding to the determined volume of the ambient sound in the first table;
   a second storing unit to store a second table mapping relationships between various noise grades and solutions, wherein the solutions alert a user to take appropriate countermeasures to reduce the risk of harm to the user from excessively loud noise in time and are associated with the various noise grades;
   a calling unit to search the second table in the second storing unit to obtain the solution corresponding to the obtained noise grade of the ambient sound; and
   an outputting unit to output an alert to a user for recommending the obtained solution.

2. The electronic device according to claim 1, wherein the electronic device is a mobile phone or a personal digital assistant.

3. The electronic device according to claim 1, wherein the first storing unit and the second storing unit are independent modules.

4. The electronic device according to claim 1, wherein the first storing unit and the second storing unit are disposed in one memory divided into different data storage areas.

5. The electronic device according to claim 1, wherein the outputting unit outputs solutions by lights flashing, a visual alert on a display, audible signals emitted from a speaker, or any combination thereof.

6. A method for noise alerting, comprising:
   recording ambient sound around an electronic device and generating corresponding sound signals;
   determining a volume of the ambient sound according to the sound signal;

obtaining a noise grade corresponding to the determined volume of the ambient sound in a first table mapping relationships between a plurality of volumes and noise grades;

searching a second table mapping relationships between various noise grades and solutions to obtain a solution corresponding to the obtained noise grade of the ambient sound, wherein the solutions alert a user to take appropriate countermeasures to reduce the risk of harm to the user from excessively loud noise in time and are associated with the various noise grades; and outputting an alert to a user for recommending the obtained solution.

7. The method according to claim 6, wherein the step of outputting the obtained solution is implemented by lights flashing, a visual alert on a display, audible signals emitted from a speaker, or any combination thereof.

\* \* \* \* \*